(12) United States Patent
Shalmon et al.

(10) Patent No.: US 8,046,001 B2
(45) Date of Patent: Oct. 25, 2011

(54) METHOD OF PROVIDING ADVERTISING TO MOBILE UNITS

(76) Inventors: Yoram Shalmon, Toronto (CA); Eran Brezner, Thornhill (CA)

( * ) Notice: Subject to any disclaimer, the term of this patent is extended or adjusted under 35 U.S.C. 154(b) by 1013 days.

(21) Appl. No.: 11/940,719

(22) Filed: Nov. 15, 2007

(65) Prior Publication Data

US 2008/0119206 A1 May 22, 2008

Related U.S. Application Data

(60) Provisional application No. 60/866,222, filed on Nov. 17, 2006.

(51) Int. Cl.
*H04W 24/00* (2009.01)
*G06Q 30/00* (2006.01)

(52) U.S. Cl. .................. 455/456.3; 705/14.64

(58) Field of Classification Search .............. 455/456.2, 455/456.3; 705/14.64
See application file for complete search history.

(56) References Cited

U.S. PATENT DOCUMENTS

| | | | |
|---|---|---|---|
| 6,114,991 A | 9/2000 | Richton et al. | |
| 6,118,977 A | 9/2000 | Vannucci | |
| 6,321,092 B1 | 11/2001 | Fitch et al. | |
| 6,466,796 B1 | 10/2002 | Jacobson et al. | |
| 6,505,046 B1 | 1/2003 | Baker | |
| 6,611,687 B1 | 8/2003 | Clark et al. | |
| 6,650,902 B1 | 11/2003 | Richton | |
| 6,757,545 B2 | 6/2004 | Nowak et al. | |
| 6,944,447 B2 | 9/2005 | Portman et al. | |
| 6,952,181 B2 | 10/2005 | Karr et al. | |
| 6,968,195 B2 | 11/2005 | Nowak | |
| 7,024,205 B1 | 4/2006 | Hose | |
| 7,035,647 B2 | 4/2006 | De Verteuil | |
| 7,039,165 B1 | 5/2006 | Saylor et al. | |
| 7,076,257 B2 * | 7/2006 | Kall | 455/456.1 |
| 7,089,264 B1 * | 8/2006 | Guido et al. | 1/1 |
| 7,130,630 B1 | 10/2006 | Enzmann et al. | |
| 7,130,641 B1 | 10/2006 | Al-Khashti et al. | |
| 7,142,876 B2 | 11/2006 | Trossen et al. | |
| 7,197,322 B1 | 3/2007 | Rayburn et al. | |
| 7,764,231 B1 * | 7/2010 | Karr et al. | 342/457 |
| 7,813,741 B2 * | 10/2010 | Hendrey et al. | 455/456.1 |
| 2006/0079248 A1 * | 4/2006 | Otsuka et al. | 455/456.1 |
| 2008/0227467 A1 * | 9/2008 | Barnes et al. | 455/456.2 |

* cited by examiner

*Primary Examiner* — Nick Corsaro
*Assistant Examiner* — Michael S Bush

(57) ABSTRACT

A method of delivering advertising to a mobile unit via at least one wireless network, in association with a Location Based Service (LBS) is provided A LBS request is received. Location information associated with the mobile unit is requested. First location information is received. Location Based Advertising (LBA) is provided to the mobile unit based on the first location information while waiting for second location information. The second location information is received. Accuracy and results of the first and second location information is compared to determine which of the first and second location information provides a most probable location of the mobile unit. The LBS is provided to the mobile unit based on which of the first and second location information provides the most probable location of the mobile unit.

15 Claims, 3 Drawing Sheets

METHOD OF PROVIDING ADVERTISING TO MOBILE UNITS

Figure 1:
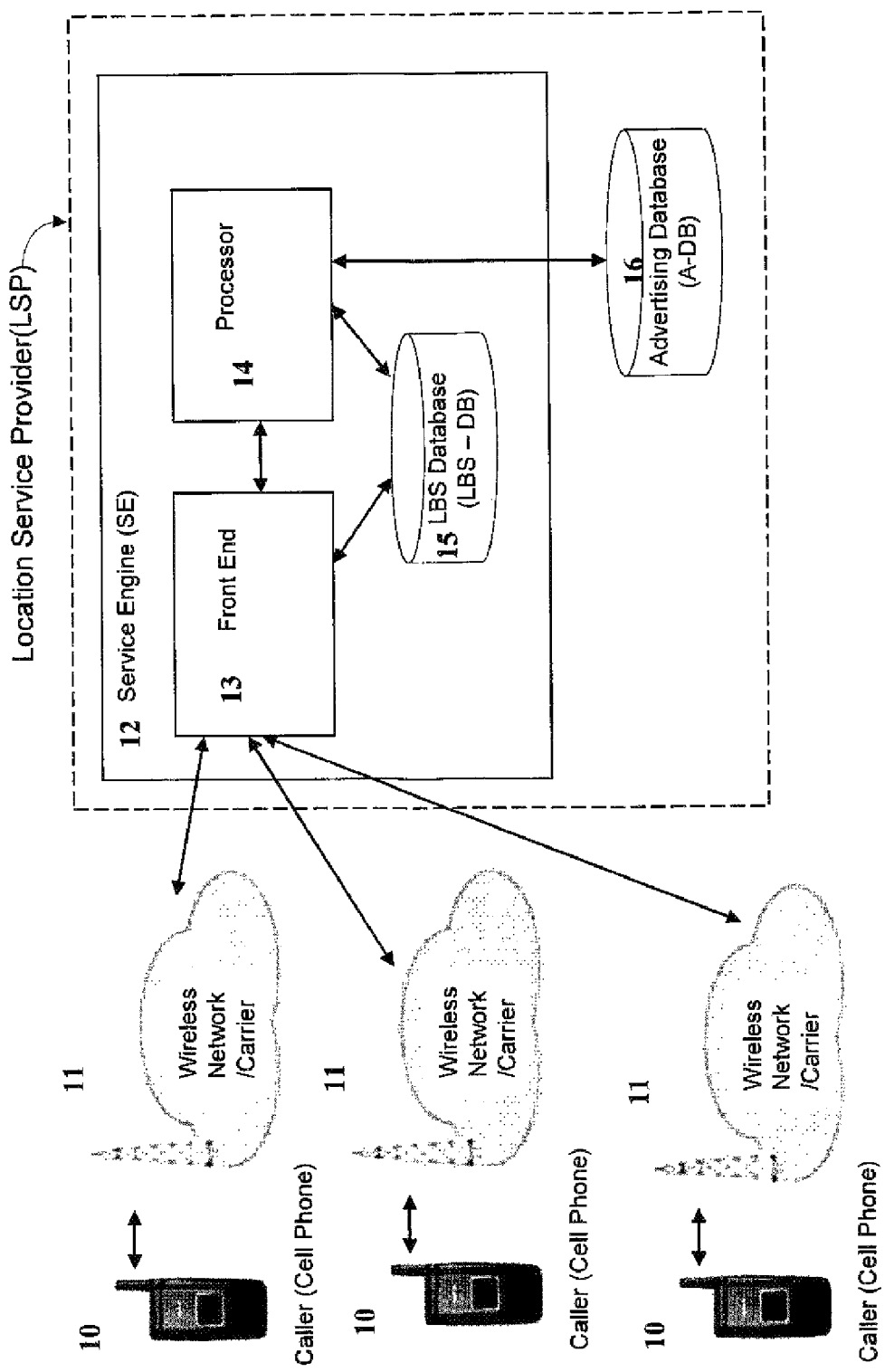

The present application claims priority from U.S. Provisional Patent Application 60/866,222, filed Nov. 17, 2006, the contents of which are incorporated herein by reference.

FIELD

The specification relates generally to Location Based Services (LBS) and specifically to providing Location Based Advertising (LBA) during the process of delivering Location Based Services (LBS) to mobile units in a wireless telecommunication network.

BACKGROUND

Wireless networks provide voice and data communication to callers using mobile units ("Cell Phones"). In recent years, the evolution of wireless network technologies increased the communication bandwidth and frequencies. Consumer oriented location technologies were developed in response or in conjunction with regulatory requirement for Emergency Services ("E 9-1-1"). Various design approaches have been implemented, using signal triangulation and processing of received signals such as Global Positioning Satellite (GPS) and Enhanced Observed Time Difference (EOTD). Location technologies vary in accuracy, sensitivity and speed of response. Overall, technologies that provide location with high accuracy such as Global Positioning Satellites (GPS) and Assisted GPS (A-GPS) require time to measure signals and calculate location. As a result, location calculated with high-accuracy will take longer time to initiate. The accuracy may be less then 10 meters but length of Time To First Fix (TTFF) maybe between 15 and 45 seconds, depending on location, components, signal strength, antennas and more Other technologies provide location information with lower-accuracy such as Cell/Sector ID, which use network level information, and accuracy that depends on structure and size of the wireless cell and the sector in which the cell phone communicates and with location accuracy results between hundreds of meters to over 1 kilometer. At the same time, Cell/Sector ID results are available significantly faster in less then 5 seconds.

In recent years, Wireless Carriers upgraded wireless networks and Cell Phones to increase the availability and accuracy of mobile location information. This evolution supports the introduction of Location Based Service (LBS). Based on location technologies, companies have designed applications and system platforms to provide LBS. Such LBS applications are used to track a variety of moving objects (individuals, vehicles, assets, animals etc) and provide information. In regards to advertising, LBS applications were designed to track the location of callers and sends advertising material, such as coupons, via short messaging service (SMS).

The advantages and benefits of LBS have been recognized and LBS applications have been in use for several years. Yet, LBS popularity is low among owners of Cell Phones and the frequency of use is limited.

Delivery of advertising, providing information and services to consumers at no charge ("For Free") in exchange for advertising, is a common practice in many areas of daily life. Most notable are Internet based services, for example consumer can participate in discussion forums, share information with friends, get free use of email, download SW applications etc in exchange for being exposed to advertising. Advertising finances the cost of radio and television where consumers receive entertainment, news and commentary in exchange for being exposed to advertising.

Wireless may be considered the "third screen" for advertising following TV and computer monitors. For example, location based advertisement and marketing information may be broadcast ("pushed") data to subscribers, as they are near specific locations. However, Location Based Advertising (LBA) has been unsuccessful and unwelcome by callers who consider it intrusive and "junk messages". Furthermore, cost, convenience and lack of attractive content are key reasons for the low popularity of LBS applications and unsuccessful usage of LBA.

SUMMARY

A method of providing LBA operates when a caller contacts a Location Service Provider (LSP), to obtain LBS information. An LSP independent platform will communicate with the caller and provide advertisement while the caller is waiting for the requested LBS information. The method will use the time interval between the availability of caller's low-accuracy location (Cell/Sector ID etc.) and high-accuracy location (GPS, A-GPS, E-CGI etc.) to provide such information.

The method increases the likelihood of beneficial outcome by requesting multiple types of locations. It uses the fastest available location to provide local advertisement. It uses the most accurate information, available within a predefined time interval to provide the LBS information.

A system of providing LBA introduces a three stages approach to providing LBS.

Stage A: The caller calls the Location Service Provider (LSP), which generate request, or requests for location of the caller. The Cell Phone location is identified using the quickest method, which provides a low-accuracy location of the calling Cell Phone. In one embodiment, Cell-Sector ID location, which is the quickest available is fast enough that the location may be available to the LSP before the call is answered by the LSP and the voice channel is connected or shortly after.

Stage B: Localized advertisement is provided to the caller. The advertisement may be provided as voice and data. In parallel, the Location Service Provider waits for high-accuracy location of the Cell Phone and when available, prepares the requested LBS data. If multiple results are available within specified time frame, then the most accurate will be used. If no additional location is available then the previously obtained low-accuracy location will be used (i.e. Cell/Sector ID).

Stage C: The Location Service Provider (LSP) will stop communication of advertisement information and use highest available resolution to provide requested LBS data to the caller.

The method requests and obtains low accuracy and high accuracy location values for the same Cell Phone. It utilizes the time interval due to fast availability of low accuracy information and slow availability of high accuracy location, to provide local advertisement. The caller's low-accuracy location information is adequate for localized advertisement. Once high-accuracy location is available or time interval has expired, the most accurate location for the requested LBS service is used.

The method may use voice and data interactively to communicate advertisement to the caller.

The method offers a unique business opportunity to use revenues from advertisement to finance providing LBS. At the same time, providing free service increases service penetration and the exposure to the advertisement.

A broad aspect of an embodiment seeks to provide a method of delivering advertising to a mobile unit via at least one wireless network, in association with a Location Based Service (LBS). The method comprises: receiving a LBS request; requesting location information associated with the mobile unit; receiving first location information; providing the location based advertising to the mobile unit based on the first location information while waiting for second location information; receiving the second location information; comparing accuracy of the first and second location information to determine which of the first and second location information provides a most probable location of the mobile unit; and providing the LBS to the mobile unit based on the most probable location of the mobile unit.

The method enables seamless integration and delivery of location based advertising with LBS, providing commercial benefits and free location based services.

In some embodiments, the first location information comprises low-accuracy, fast response location information and the second location information comprises high-accuracy, slow response location information In other embodiments, the LBS request may be for any of a plurality of Location Based Services offered by a Location Service Provider, the plurality of services comprising at least one of requesting location of points of interest requesting location of services, requesting location based information, and requesting location of individuals.

In further embodiments, the location information associated with the mobile unit is generated by a plurality of location finding equipment, the location information comprising location coordinates and a measure of accuracy of the location coordinates. In some of these embodiments, the measure of accuracy of the location coordinates comprises an accuracy radius. In other of these embodiments, lower-accuracy location information is generated using Cell/Sector ID technology and higher-accuracy location information is generated using at least one of A-GPS technology and a GPS unit embedded in the mobile unit.

In yet further embodiments, the Location Based Advertising (LBA) comprises at least one of messages, offers, and surveys.

In some embodiments, the accuracy is dependent on location finding equipment used for a determination of the first and second location information, the determination of the first and second location information being independent of each other.

In other embodiments, providing the Location Based Advertising (LBA) to the mobile unit occurs via at least one of a voice communication and a data communication.

In further embodiments, the method further comprises determining a location of the mobile unit using results from a plurality of Location Finding Equipment (LFE) with the plurality of LFE having different levels of accuracy and response times, wherein first available location information is used to provide the LBA to the mobile unit while waiting for additional LFE results.

In some embodiments, providing the LBS to the mobile unit occurs in response to determining which of the first and second location information provides the most probable location of the mobile unit.

In other embodiments, providing the location based advertising to the mobile unit stops when the providing the LBS to the mobile unit is about to commence.

In further embodiments, the method further comprises determining accuracy of the most probable location of the mobile unit, and providing the LBS to the mobile unit occurs if the accuracy of the most probable location exceeds a threshold accuracy. In some of these embodiments, providing the LBS to the mobile unit occurs only if the accuracy of the most probable location exceeds a threshold accuracy.

In some embodiments, the first and second location information comprises a location of the mobile unit. In some of these embodiments, the first and second location information further comprises at least one of an accuracy radius and a velocity of the mobile unit, and the method further comprises determining the accuracy of the first and the second location information based on at least one of the location of the mobile unit, the accuracy radius, the velocity of the mobile unit, and a time delay between measurement of location information and calculation of accuracy, for each of the first and second location information.

The method offers delivery of LBS service and advertisement. Delivery by voice corresponds to Cell Phone primary usage for exchange of audio information. Voice delivery allow for "hands free" approach and can be used when caller is unable to touch keypad or view Cell Phone screen, for example while driving or while using a headset. Providing LBA as data, for visual information, may be in the form of messages (SMS), electronic mail and files.

The method is independent of wireless carriers and wireless networks regardless of standards and frequencies. The benefit is a wider audience, which enables delivery of LBA to more callers. The wide audience reduces cost of providing LBS and LBA, and increases the economic viability to the LSP.

BRIEF DESCRIPTIONS OF THE DRAWINGS

Embodiments are described with reference to the following figures, in which.

Figure 2:
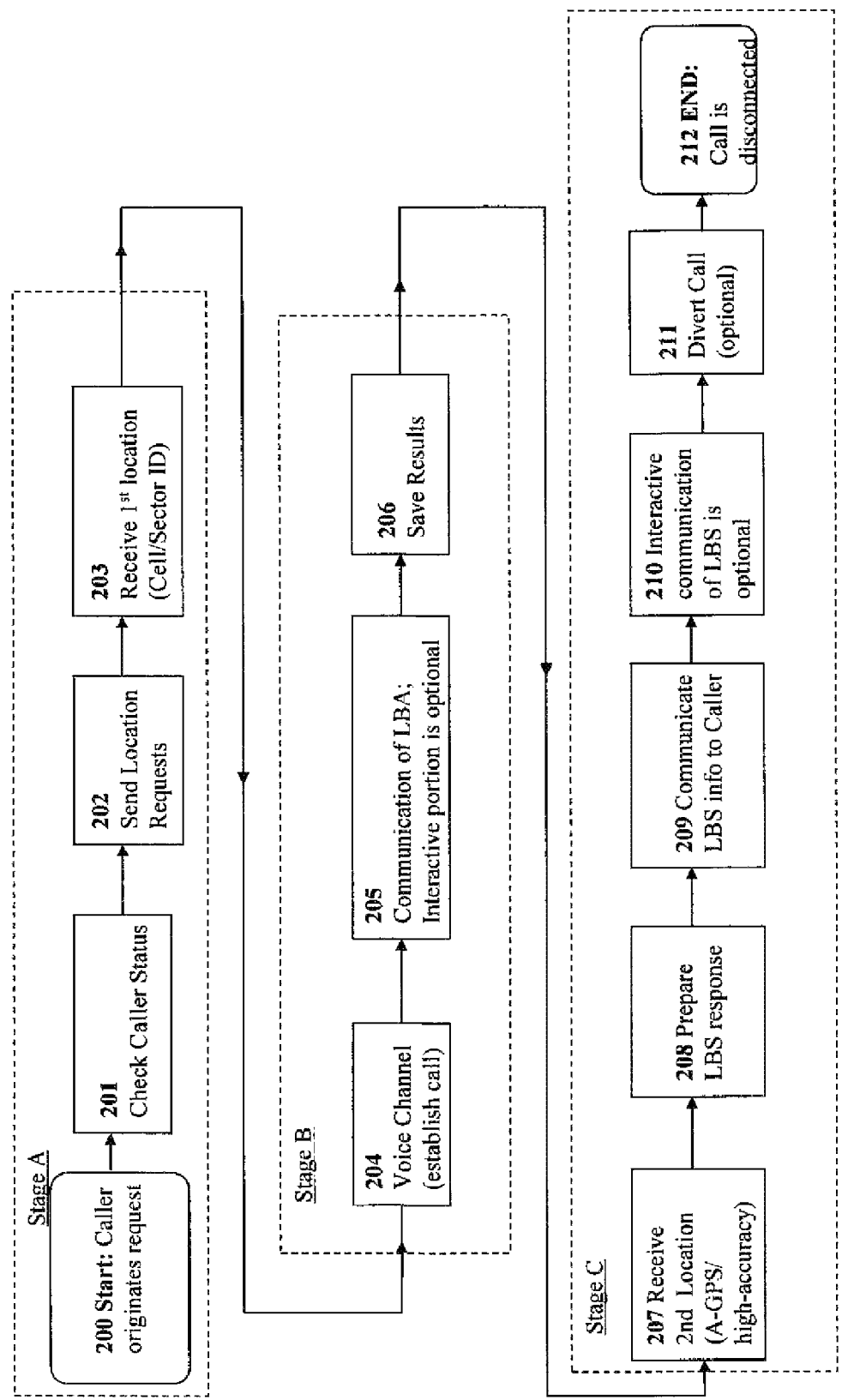
Figure 3:
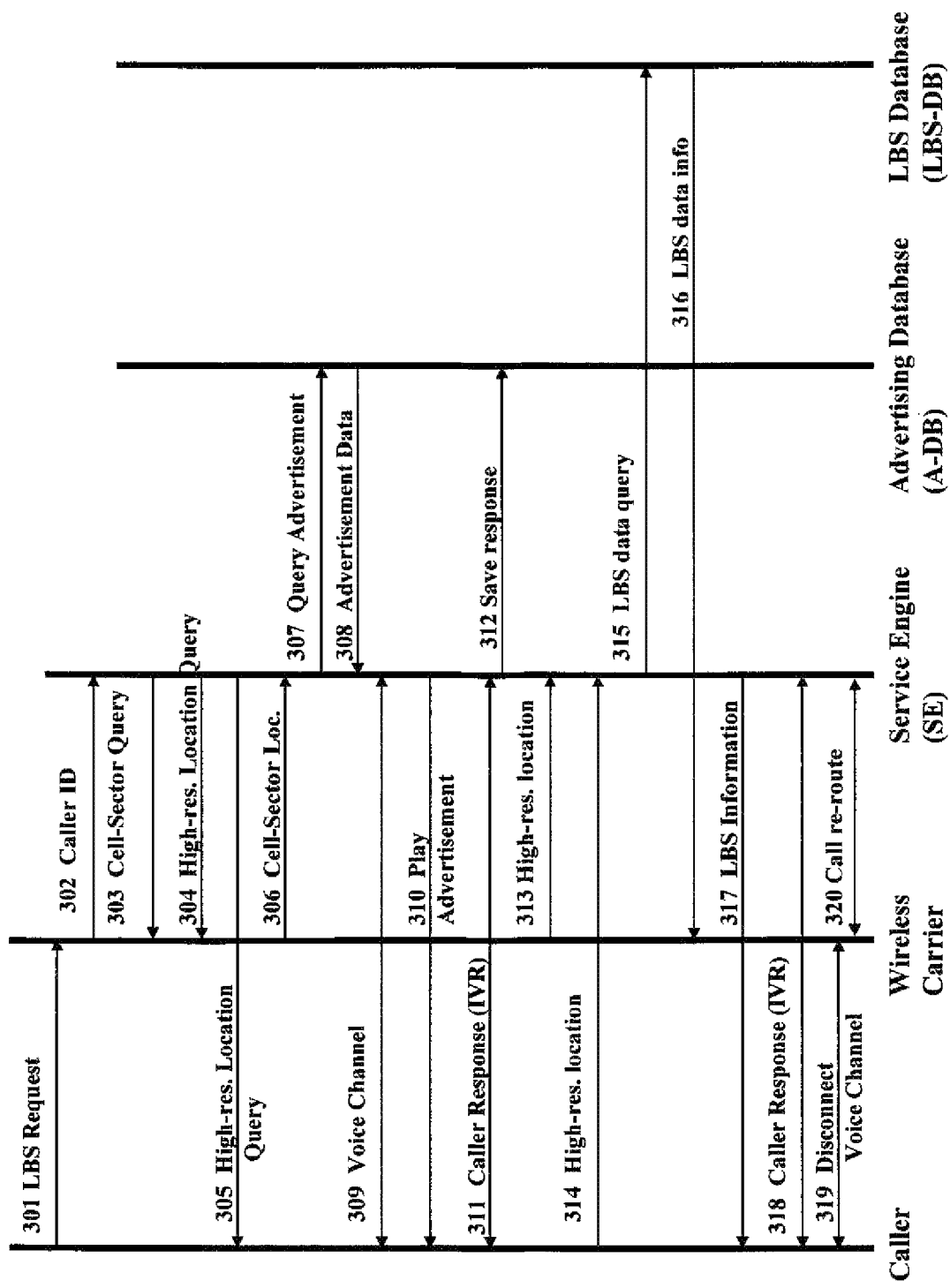

FIG. 1 describes the overall system architecture, according to a non-limiting embodiment, with mobile callers represented as multiple handsets, Wireless Carriers and Wireless Networks represented as a "cloud" with wireless tower, and the Location Service Provider (LSP) system represented as a single architecture block with Front-End, Processor and Database elements and the Advertisement represented as a single Database;

FIG. 2 describes the call progress, according to a nonlimiting embodiment, which occurs when a location service request is initiated, with a group of actions represented in a single block rather then an array of activities and decision points; and FIG. 3 describes the service process, according to a non-limiting embodiment, as origination and termination of actions when commands and information are transferred between system elements, and an exchange protocol of information between two elements represented as a single event.

DETAILED DESCRIPTION OF THE EMBODIMENTS

The architecture of a system for providing location based advertising is described in FIG. 1. The system of FIG. 1 comprises:

Multiple callers with cell phones 10.

Multiple wireless carriers 11, which operate on different and independent Wireless Networks.

A LSP (Location Service Provider) comprising several modules:

The Advertisement Database (A-DB) 16, which stores information available to the LSP for broadcasting, such as advertising, promotion, survey and public announcements a Service Engine (SE) 12 having multiple processing, storage and database and interface capabilities, such as connectivity to the Wireless Carriers, to the Internet, other databases and an operation support system (OSS). For simplicity, the key elements of the SE are:

a Front-End 13, responsible for interface with the Wireless Carriers and with the callers;

a Processor 14 which runs the application software.

an LBS Database (LBS-DB) 15 represents various databases used for delivery of the LBS application, stores all information used in delivery of the service, including caller and service information. The LBS database stores multiple elements relating to the LBS service including caller information, service information and administrative data.

Reference is now made to FIG. 2, which describes the call progress in the system of FIG. 1.

In Stage A:

The call progress starts at 200 when the caller calls the SE, to initiate an LBS request. The SE checks (201) the caller's information and defines best response. The SE sends location request, or requests, (202) to the Wireless Carrier. The Wireless Carrier responds (203), providing quickest available location, likely by Cell/Sector ID based location of the Cell Phone, which is a quick response but low-accuracy location.

In Stage B:

A Voice channel is established (204) between the caller and the SE, independently from receiving location information. Typical delay for Cell/Sector ID location information is 1-2 seconds, which enables the SE to calculate applicable advertisement while caller is greeted by the system. The SE uses the voice channel for verbal communication of Location Based Advertisement (205) with the caller. The SE may send data either on the voice channels or on a separate data channel. The caller may optionally interact with the advertisement using voice interface such as Speech Recognition and/or Cell Phone keypad for this optional interaction. Any results of Stage A and Stage B may be saved (206).

In Step C:

The SE receives higher-accuracy location information 207. The SE will use all locations, available within the allotted time interval, to prepare the requested LBS Data set 208. Location Finding Equipment (LFE) calculates accuracy radius based on specific parameters of the given technology. It is possible that low-accuracy location information will be available with better accuracy radius (lower value) then higher-accuracy location information. In choosing the most accurate result, the SE may consider multiple parameters such as the reported accuracy radius, time delay, velocity of the caller and inherent accuracy of the different LFE. In a non-limiting example, assume that location result is available from a low-accuracy LFE for a caller moving at speed of 50 Km per hour with 50 meters accuracy radius. This location will be used to provide LBA information. Thirty (30) seconds later, SE receives different location result for same caller from a high-accuracy LFE, showing caller moving at speed of 50 Km per hour with accuracy radius of 100 meter. The SE is likely to prefer later location result for LBS, regardless of worse accuracy radius (higher value), because a caller moving at speed of 50 Km per hour is likely not to be at the same place it was 30 seconds ago. The SE communicates 209 with the caller and provides the requested LBS information to the caller. The caller may optionally choose further interaction 210 with the LSP, to request further information via voice and/or data. The caller may elect to divert the call 211 to another service, transfer to a 3rd party, leave a message or connect with a human operator. The call ends 212.

Reference is now made to FIG. 3, which describes a simplified communication schema with time line, The caller initiates a LBS request 301 by dialing to the LSP. Details of the call, including the called telephone number, the calling telephone number, the calling individual (in SIM card for GSM/GPRS) and other identifiers are communicated as signalling information over the network. The calling Cell Phone identifier, referred to as Calling Line Identifier (CLID), is received 302 by the SE. For GSM/GPRS this information will include identity of the caller, based on the SIM card. In some situations (in some telecommunication networks) the received CLID may be different from the telephone number of the caller; in such situations the method will be modified to take the change into account.

The SE uses the caller identification to check caller's status and eligibility for service. If service is approved, then SE proceeds with the service request and send multiple location requests, for example 303, 304, 305. One request 303 for low-accuracy location, such as Cell/Sector ID, is sent to the Wireless Carrier. Other requests 304, 305 are for higher-accuracy location, sent to the Wireless Carrier and/or to the Cell Phone, depending on the wireless network and the Cell Phone technology. The requests 303, 304, 305 are independent and may be generated at any order or delayed from each other. In some embodiments, request 303 is sent first to ensure quick availability of location information for the purpose of LBA. In other embodiment a single request may generate a location query using multiple LFE and result in multiple locations for the same caller.

The Wireless Carrier receives the first location request 303 (i.e. Call/Sector ID) and reply with the location message 306, which in some embodiments is available in less then 2 seconds. The location may be expressed as Longitude and Latitude values and may comprise an accuracy indicator, such as accuracy radius. Accuracy of the location response depends on geometry and radius of the wireless cell. In urban areas cell size are smaller and may be 1 to 3 km diameter, while in non-urban cell size may be as large as 20 km diameter.

The SE sends a query 307 to the Advertisement Database (A-DB) with details of the Cell Phone location and any caller information. The Advertisement database responds with Advertisement information message 308, which is the localized and personalized advertising information to be communicated to the specific caller at the defined location.

Following the service request (e.g. dialing) 301, a voice channel 309 is established between the caller and the SE. The SE communicates 310 the advertisement over the voice channel to the caller. In some embodiments, the caller may respond 311 leading to an interactive exchange of information. For example, the advertisement may be a survey and the caller may elect to participate and respond to questions. Caller response 311 can be an Interactive Voice Response (IVR) session process, using telephone keypad and/or speech recognition, between SE and caller. Caller's response 311 to the advertisement can be saved 312 in the Advertisement Database (A-DB) and acted upon. For example, results of a survey will be collected and communicated to customers of the Location Service Provider (LSP). There is also possibility of rerouting the call 320 by generating a new call and connecting the caller to another destination. Such call re-route may be a result of caller response 311 or caller response 318.

While the voice channel 309 may be already open and in use, the Cell Phone and/or the Wireless Carrier, will send higher-resolution location messages 313, 314 to the SE. The SE will choose the location information available, which provides the most probable location and query the LBS Database 315. The LBS-DB will provide the required information 316. The SE will prepare the LBS information Data Set response to the caller's request. When the information is ready the SE may stop the communication of advertisement 310, if it still being played, and will communicate the LBS information 317.

The caller may respond 318 leading to an interactive exchange of information. Through interaction with the customer, the SE may send additional information 319 and/or data messages, such as SMS, Email and electronic files. The session ends when the voice channel is disconnected 319. Alternatively the call is re-routed 320 and the voice channel will be disconnected only after the re-routed call ends.

In some embodiments, callers who wish to eliminate or reduce Advertisements, during wait for LBS results, may be willing to pay a service charge. Non-limiting examples of such embodiments include, but are not limited to:

Embodiment 1

Music/News on hold—The Service Provider can broadcast Music or News on hold, including individual selections of the caller.

Embodiment 2

Outbound Call—The LSP can disconnect the call after establishing requirement for LBS. A new call will be established, as an outbound call, by the LSP once the LBS information is available.

Embodiment 3

Selective Advertisement—The caller indicates the types of advertisements, which are acceptable to the caller. For example public announcements, surveys and weather reports may be acceptable while advertisement for products and services may not be acceptable.

Embodiment 4

Recalculate Location—The caller's location might have changed substantially during the call and the caller may wish to have the Cell Phone location recalculated, for a more accurate service. The caller can reinitiate a request for LBS information, without the need to redial with a new service request, or the caller may be tracked for location during preset duration at preset intervals.

Those skilled in the art will appreciate that in some embodiments, the functionality of the Location Service Provider of FIG. 1 may be implemented using pre-programmed hardware or firmware elements (e.g., application specific integrated circuits (ASICs), electrically erasable programmable read-only memories (EEPROMs), etc.), or other related components. In other embodiments, the functionality of the Location Service Provider of FIG. 1 may be achieved using a computing apparatus that has access to a code memory (not shown) which stores computer-readable program code for operation of the computing apparatus. The computer-readable program code could be stored on a medium which is fixed, tangible and readable directly by these components, (e.g., removable diskette, CD-ROM, ROM, fixed disk, USB drive), or the computer-readable program code could be stored remotely but transmittable to these components via a modem or other interface device connected to a network (including, without limitation, the Internet) over a transmission medium. The transmission medium may be either a non-wireless medium (e.g., optical or analog communications lines) or a wireless medium (e.g., microwave: infrared, free-space optical or other transmission schemes) or a combination thereof.

Persons skilled in the art will appreciate that there are yet more alternative implementations and modifications possible for implementing the embodiments, and that the above implementations and examples are only illustrations of one or more embodiments. The scope, therefore, is only to be limited by the claims appended hereto.

We claim:

1. A method of delivering location based advertising (LBA) to a mobile unit via at least one wireless network, in association with a location based service (LBS), the method comprising;
   a. Receiving a LBS request of an end user for LBS, using a mobile unit, to a Service Engine (SE), which is operated by business entity referred to as a location service provider (LSP);
   b. SE requesting location information associated with the mobile unit from mobile unit and/or from wireless network;
   c. SE receiving first location information of mobile unit;
   d. SE providing location based advertising to the mobile unit based on said first location information;
   e. SE receiving said second location information;
   f. SE comparing accuracy of said first and second location information to determine which of first said and second location information provides a most probable location of the mobile unit; and
   g. SE stopping to provide LBA and providing the LBS to the mobile unit based on which of said first and second location information provides said most probable location of the mobile unit.

2. The method of claim 1, wherein first said location available to SE comprises low-accuracy, fast response location information and said second location information available to SE comprises high accuracy, slow response location information and which is provided by a different acquisition method.

3. The method of claim 1, wherein said LBS request, by mobile unit, may be for any of a plurality of location based services offered by a location service provider, using SE, said plurality of service comprising at least one location of points of interest, requesting location of services, requesting location based services, requesting location based information, and requesting location of individuals.

4. The method of claim 1, wherein said location information associated with the mobile unit is generated by a plurality of location finding equipment technologies, hence results of multiple location information technologies are made available to the SE and are used, independent of each other, said location information comprising location coordinates and a measure of accuracy of said location coordinates.

5. The method of claim 4, wherein said measure of accuracy of said location coordinates comprises an accuracy radius, velocity of mobile unit and time of location information.

6. The method of claim 4, wherein lower-accuracy location information is generated using Cell/Sector ID technology and higher-accuracy information is generated using at least one of A-GPS technology and a GPS unit embedded in the mobile unit.

7. The method of claim 1, wherein said location based advertising comprises at least one of messages, offers, and surveys.

8. The method of claim 1, wherein said accuracy of mobile unit is dependent of location finding equipment used for determination of a first and second location information, the determination of said first and second location information being independent of each other and being outcomes of two different, independent process and technologies to obtain location information.

9. The method of claim 1, wherein said providing the location based advertising, by the location service provider (LSP), to the mobile unit occurs via at least one of voice communication and a data communication.

10. The method of claim 1, further comprising determining a location of the mobile unit by the SE using results for a plurality of location finding equipment (LFE) with said plurality of LFE having each different levels of accuracy and response times, wherein first available, to the SE, location information is used, by location service provider (LSP), to provide the LBA to the mobile unit and at the same time, the SE seeks location of mobile unit with higher accuracy and prepares LBS based on improved accuracy.

11. The method of claim 1, wherein said providing the LBS, by LSP, to the mobile unit occurs in response to determining which of said first or second location information provides said most, probable location of said mobile unit.

12. The method of claim 1, wherein said providing the location based advertising, by LSP, to the mobile unit stops when said providing the LBS, by LSP, to the mobile unit is about to commence.

13. The method of claim 1, further comprising determining, by the SE, accuracy of said most probable location of the mobile unit, and said providing the LBS to the mobile unit occurs if the accuracy of said most probable location exceeds a threshold accuracy.

14. The method of claim 1, wherein said first and second location information, available to SE, comprises a location of the mobile unit.

15. The method of claim 14, wherein said first and second information further comprises of accuracy radius and a velocity of the mobile unit, and further comprising determining said accuracy of each said first and said location information based on said location of the mobile unit, said accuracy radius, said velocity of the mobile unit, and a time delay between measurement of location information and calculation of accuracy, for each of said first and second location information.

* * * * *